United States Patent [19]

Mantovaara

[11] Patent Number: 4,810,237
[45] Date of Patent: Mar. 7, 1989

[54] V-BELT PULLEY AND DRIVE

[76] Inventor: Urpo Mantovaara, Opiskelijankatu 52, 33720 Tampere, Finland

[21] Appl. No.: 55,621
[22] PCT Filed: Sep. 8, 1986
[86] PCT No.: PCT/FI86/00095
 § 371 Date: Jun. 22, 1987
 § 102(e) Date: Jun. 22, 1987
[87] PCT Pub. No.: WO87/01425
 PCT Pub. Date: Mar. 12, 1987

[30] Foreign Application Priority Data

Sep. 9, 1985 [FI] Finland .................. 853430

[51] Int. Cl.⁴ ........................... F16H 55/36
[52] U.S. Cl. .................... 474/166; 474/189
[58] Field of Search .......... 474/166, 168, 174, 152, 474/159, 160, 188, 189

[56] References Cited

U.S. PATENT DOCUMENTS 740,258 9/1903 Ensign .................. 474/189

FOREIGN PATENT DOCUMENTS 224180 7/1910 Fed. Rep. of Germany .
821743 11/1951 Fed. Rep. of Germany .
2324998 2/1975 Fed. Rep. of Germany .
428677 10/1983 Switzerland .

Primary Examiner—Thuy M. Bui
Attorney, Agent, or Firm—Toren, McGeady & Associates

[57] ABSTRACT

The objects of the invention are a V-belt pulley and drive and it relates to V-belt transmissions, where the belt is a die-cut type without changes in the construction in the lateral direction. The aim is to improve efficiency and safety of function, in particular in slow-running drives working in dirty environment. The method used is to make arched round bottomed grooves on the contact surfaces of the pulleys. By optimizing of the spiral forms and their inclination angles it has been tried to control the wedging of the belt between contact cones of the pulleys and besides to reduce the radial sliding of the belt. It can also be useful to make two groovings crossing each other onto the contact surfaces to assist them in getting and staying clean.

12 Claims, 1 Drawing Sheet

V-BELT PULLEY AND DRIVE

The invention relates to V-belt drives, which includes two or more pulleys and a die cut type V-belt. The most typical adaptations are such drives and variators, where a reliable function and suitability to variable circumstances are preferred to a long wearing life of the belt. The invention will improve the function of the V-belt drive in particular at low running speeds of the belt, but besides the speed range can as well grow upwards.

The basic idea of the invention is to make low grooves with round bottom onto the contact surfaces of pulleys. The teeth between the grooves can be sharp or rounded. The principal advantage gained by groovings is to improve efficiency and safety of the function. The characteristic features of the invention are presented more in detail in the enclosed patent claims.

In itself it is not a new idea to make grooves onto contact surfaces of a pulley. In the variators type PIV with laminated toothed chains it is known already since the year 1924, German Pat. Nos. 430252 and 435554.

The aforementioned grooves in PIV-variators have round profiles and they are straight, accurately radial and in the opposite sheaves so staggered located that they form teeth into the chain, reducing the slide effectively.

This same idea has been applied also to rope winches for example in the German patent application No. 2328474. The object of teeth is to bend the rope into crosswise curves and thus to prevent it from sliding on the pulley.

The Swedish patent application No. 302545 and the U.S. Pat. Nos. 3,730,483 and 4,093,185 include compared with the former an additional insight, that the straight grooves can be inclined and it is possible to strengthen or reduce the sinking of the rope between the cones of pulley through selection of the direction of skewness.

The Swedish patent application No. 428677 (Uno Ekman 1982) and the U.S. Pat. No. 4,151,980 include further such a feature, that the teeth added or formed on the pulley cones can be shaped like a circle. The object of the arched form is however only to improve the grip of the cone surfaces on a rope, chain or round rod running between them. If these groovings were applied to V-belt pulleys, the function would despite of the arched form not be better compared with radially grooved cone pulleys.

There are also prior known V-belt pulleys, where contact surfaces have grooves or teeth arched in shape. The document DEPS No. 224180 from year 1910 includes a V-belt pulley, where identical halves are cut in such a manner, that they screw into one other. The boundary surfaces of the teeth are perpendicular closed screw surfaces, whose intersections on symmetrical cones are spirals, which are identical but inclined to opposite directions.

This opposite direction of inclination causes, that the form of spirals does neither improve the efficiency of drive nor reduce the wear on the flanks of the V-belt. This fact is valid also for the V-belt pulley described in the document DEPS No. 821743, which pulley deviates from the afore mentioned only so that the contact cone surfaces consist of fingers, which are connected to the wheel only at the outer ring. According to the description the form of the fingers can be for example a spiral of Archimedes.

A V-belt pulley, where the contact surfaces are equipped with grooves having an exact form of the spiral of Archimedes, is introduced in the document DEPS No. 2324998. This invention is characterized by a small pitch of the spiral, pro round only ca a half of the height of the V-belt running on the pulley, The belief of the inventor, that a grooving like this would reduce vibrations of the belt, is based on the supposition, that the sliding of the belt on the contact surfaces of pulleys would take place evenly in the whole contact sector. According to the newest investigations this theory is not valid.

The spiral grooves according to the present invention deviate from the afore described by such a manner that the spiral form is an involute or approaching it. The deviations from the involute forms are needful, because the belts can be made fully rigid against neither the tension nor the lateral compression. The needful deviations are however so small, that they can be detected only by measuring devices, not by the eye.

The invention will be described more in detail below with reference to the accompanying drawing, wherein:

FIG. 1 diagrammatically shows a straight radial grooving on a cone pulley of a V-belt drive.

Figure 1:
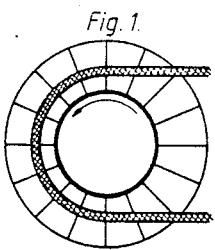
Figure 2:
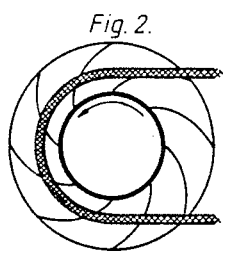
FIG. 2 shows a spiral grooving, which is bent backwards in relation to the rotation.
Figure 3:
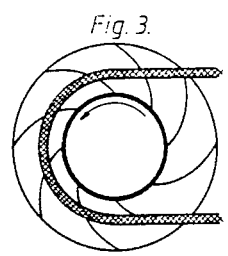
FIG. 3 shows a spiral grooving bent forwards in relation to the rotation.
Figure 4:
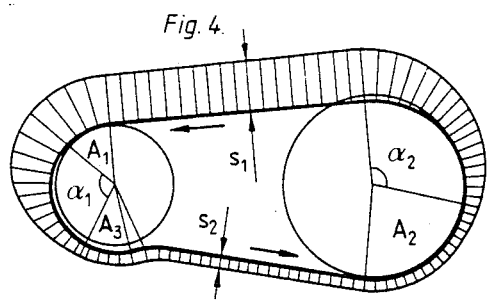

FIG. 4 diagrammatically shows the path of the belt and the variation of the tension force in a slow-running V-belt drive, where the wedge angle $\beta$ of belt and pulleys is small.

Figures 5, 6:
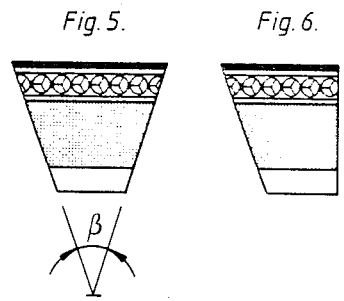

FIGS. 5 and 6 show cross sections of V-belts with a symmetric and an asymmetric profile.

Figure 7:
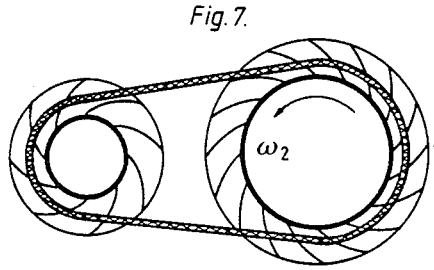

FIG. 7 diagrammatically shows an adjustable drive which generally lowers the rotation speed and the groovings on the contact surfaces on the pulleys, when the wedge angle $\beta$ is small.

Figure 8:
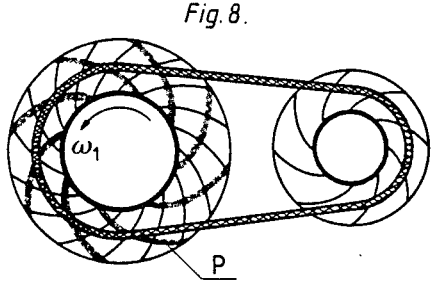

FIG. 8 shows an adjustable drive generally increasing the rotations speed, where the contact surface of driving pulley has two crossed groovings.

Figure 9:
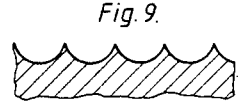

FIG. 9 shows the cross section of a grooving where the teeth between the grooves are sharp.

Figure 10:
Figure 11:
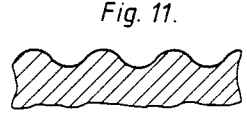

FIG. 10 shows the cross section of a grooving with blunt teeth and FIG. 11 with rounded teeth.

The basis of the invention is the observation, that in the driving pulley where the wedge angle is small compared to the friction angle between the flanks of the V-belt and the contact surfaces of the pulley $$\beta/2 < < \arctan \mu$$

a static contact arch or rest angle (Ruhewinkel) is formed as well onto the arrival side ($A_1$) as onto the exit side ($A_3$).

When the loading tangential force increases in relation to the pretensioning force of belt, the rest angle $A_1$ on the arrival side decreases, while that on the exit side ($A_3$) increases until a full slide on the whole arch occurs.

The principal influence of the rest angle on the exit side is, that the belt is jammed between the cone surfaces of the driving pulley and it must tear itself off. This causes a loss of driving torque since the leverage of the force $S_2$ decreases.

In the driven pulley the torque decreases at the power transmission sector ($\alpha_2$), since the belt is compressed narrower and wedged deeper between the cone surfaces.

By the groovings according to this invention both afore mentioned torque losses can be reduced. For example at a speed reducing V-belt drive (FIG. 7) a part of the power loss caused by the tangential slide is substituted by decreasing loss of torque, when the spiral form of the grooving is made slightly deviating from the involute towards the form of a logarithmic spiral.

The spiral form for the grooving in the driving pulley shall deviate from the involute form to the opposite direction from the logarithmic spiral, so that the belt would have a possibility to shorten without sliding over the teeth of the groovings. Due to the deviation a force component is formed pushing the belt out from the nip between the contact surfaces and thus the rest angle $A_3$ is decreased or prevented from forming.

Also at a speed increasing drive (FIG. 8) the spiral form of the grooving of the driven pulley shall deviate from the involute to the direction of the logarithmic spiral.

The optimal spiral forms depend on the relations of the elastic properties of the V-belt against crosswise compression and lengthwise tension. It is a very complex and tiring task to find the right forms only by calculations. In pulleys where the radius of the contact ring remains constant the form can be a circle tangent to the theoretical spiral and having the same radius. The desired deviation from the theoretical form can in these cases be achieved by a radial movement of the touch point.

In practice there is no reason to seek very accurate forms, since the loading force and the quality of the belt are usually inconsistent.

The optimal cross section profile of the grooving depends on how strong an influence is desired. A grooving with sharp teeth (FIG. 9) is the most effective, but wears the belt more than the grooving with blunt (FIG. 10) or round teeth (FIG. 11).

If the V-belt drive is working in very dirty or icy environment, it can be beneficial to make two groovings crosswise to another onto some pulley of the drive. The additional grooving (P in FIG. 8) shall be rounded in shape, lower and coarser-meshed than the proper grooving.

If the cross section of the V-belt is asymmetric (FIG. 6) the grooving on the pulley cone surfaces can also prevent the tendency of the belt to turn on its side or upside down when overloaded. That is achieved by making the directions of curvature or the inclination angles different on opposite cone surfaces or by leaving one of the surfaces smooth.

The invention is not confined to the examples described afore, but can be varied in the limits of the enclosed patent claims. In particular a further development is possible by adapting the manufacturing technology of bevel gears with spiral-formed teeth in production of pulleys or forming tools for them.

I claim:

1. A V-belt pulley, having an axis and contact surfaces, the pulley adapted for receiving a belt having flanks, wherein at least one of the surfaces contacting the flanks of the belt is grooved in an arch form, the surfaces contacting the flanks along a contact ring, wherein the arch form of the grooves projected to a plane extending normal relative to the pulley axis is a spiral approaching an involute.

2. A V-belt pulley according to claim 1, wherein there are two groovings on the contact surface crossing each other and having different cross section profiles.

3. A V-belt drive wherein at least one surface in contact with a flank of the belt is grooved in a manner according to claim 1 or 2.

4. A V-belt drive according to claim 3, wherein the spiral forms of the groovings on the contact surfaces are curved backwards in relation to rotation as well in the driving as in the driven pulley.

5. A V-belt drive according to claim 4, wherein the spiral form of the groovings projected to the normal plane of the pulley axis are deviating from the involute to the direction of a logarithmic spiral in the driven pulley and to the opposite direction in the driven pulley.

6. A V-belt drive according to claim 3, wherein the spiral forms of the groovings on the contact surfaces are curved to different directions in the driving and in the driven pulley.

7. A v-belt drive according to claim 6, wherein the spiral forms of the groovings projected to the normal plane of the pulley axis are deviating from the involute to the direction of a logarithmic spiral in the driven pulley and to the opposite direction in the driving pulley.

8. A V-belt pulley, having an axis and contact surfaces, the pulley adapted for receiving a belt having flanks, wherein at least one of the surfaces contacting the flanks of the belt is grooved in an arch form, the surfaces contacting the flanks along a contact ring, wherein the arch form of the grooves projected to a plane extending normal relative to the pulley axis is a spiral approaching a circle tangent to a theoretical involute at a touching point in the area of the contact ring and having the same radius at the touching point.

9. A V-belt pulley according to claim 8, wherein there are two groovings on the contact surface crossing each other and having different cross section profiles.

10. A V-belt drive wherein at least one surface in contact with a flank of the belt is grooved in a manner according to claim 8 or 9.

11. A V-belt drive according to claim 10, wherein the spiral forms of the groovings on the contact surfaces are curved to different directions in the driving and in the driven pulley.

12. A V-belt drive according to claim 10, wherein the spiral forms of the groovings on the contact surfaces are curved backwards in relation to rotation as well in the driving as in the driven pulley.

* * * * *